United States Patent
Miller

(10) Patent No.: US 10,491,533 B1
(45) Date of Patent: Nov. 26, 2019

(54) DYNAMICALLY CONFIGURED OVERLAY MULTICAST

(71) Applicant: Amazon Technologies, Inc., Reno, NV (US)

(72) Inventor: Kevin Christopher Miller, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 587 days.

(21) Appl. No.: 13/904,877

(22) Filed: May 29, 2013

(51) Int. Cl.
H04L 12/911 (2013.01)

(52) U.S. Cl.
CPC .................................. H04L 47/70 (2013.01)

(58) Field of Classification Search
CPC . H04L 47/70; H04L 45/64; H04L 2012/5641; H04L 2001/0096; H04T 2001/107
See application file for complete search history.

(56) References Cited

U.S. PATENT DOCUMENTS

| 7,953,083 B1* | 5/2011 | Evans et al. ................... 370/390 |
| 2003/0158959 A1* | 8/2003 | Jayapalan .............. H04L 1/1854 709/237 |
| 2004/0264385 A1* | 12/2004 | Hennessey .............. H04L 41/12 370/252 |
| 2009/0241108 A1* | 9/2009 | Edwards ............... G06F 21/604 718/1 |
| 2011/0282945 A1* | 11/2011 | Thyni et al. ................. 709/204 |
| 2012/0005675 A1* | 1/2012 | de Waal ............. G06F 9/45558 718/1 |
| 2013/0034109 A1* | 2/2013 | Cardona ............. H04L 12/4633 370/419 |
| 2013/0136138 A1* | 5/2013 | Miller et al. ............. 370/395.53 |
| 2014/0056151 A1* | 2/2014 | Petrus ..................... H04L 69/22 370/242 |
| 2014/0123136 A1* | 5/2014 | Beda, III ............ G06F 9/45558 718/1 |
| 2015/0172104 A1* | 6/2015 | Brandwine ............. H04L 69/40 709/224 |
| 2015/0244617 A1* | 8/2015 | Nakil ..................... H04L 43/04 709/224 |

OTHER PUBLICATIONS

Title: Overlay Networks Stoica: [http://web.archive.org/web/20060323113401/http://www.cs.virginia.edu/~cs757/slidespdf/757-09-overlay.pdf] Date: Mar. 23, 2006.*

* cited by examiner

*Primary Examiner* — Azizul Choudhury
(74) *Attorney, Agent, or Firm* — Davis Wright Tremaine LLP

(57) ABSTRACT

A participant in a network is configured to query a data storage system to determine whether there have been any changes to a network. The participant receives a response to the query and determines, based at least in part on the response, whether reconfiguration is necessary. If the network has changed (e.g., if the network topology has changed), as indicated in the response, the system performs one or more actions in accordance with the response. Multiple participants in the network may query the data storage system so that, collectively, network updates are initiated by changes to data in the data storage system. The network may be an overlay network that allows communication according to a communication protocol, such as multicast, that may not be completely supported by a physical network substrate.

27 Claims, 10 Drawing Sheets

DYNAMICALLY CONFIGURED OVERLAY MULTICAST

BACKGROUND

Multicast and other communication protocols are often used by a variety of applications to deliver data to multiple recipients in a network environment. In traditional multicast network environments, a sender may send packets of data to a network whereby various routers in the network may replicate the packets and subsequently deliver the data to various interested recipients. Despite the many advantages to traditional multicast networks, there are several issues that affect the implementation of multicast in larger networks. For example, in many conventional traditional multicast networks, all routers in the network must be part of the same administrative domain, thereby making configuration of a large multicast network difficult. Some techniques have been developed to address these issues. For instance, overlay multicast networks implement an overlay topology which eliminates the need for all routers to be part of the same administrative domain. However, even with current conventional techniques, such as the use of overlay multicast networks, several issues remain. For example, in a dynamically changing environment, it may be difficult for an administrator of an overlay multicast network to configure the network properly as participants are often changing. Additionally, it may be difficult or at least burdensome for the administrator to reprogram each participant instance when a participant leaves or joins the network. Generally, adequately addressing these issues presents additional costs to the organizations that rely on multicast or other protocols and to the service provider.

BRIEF DESCRIPTION OF THE DRAWINGS

Various embodiments in accordance with the present disclosure will be described with reference to the drawings, in which.

DETAILED DESCRIPTION

Figure 1:
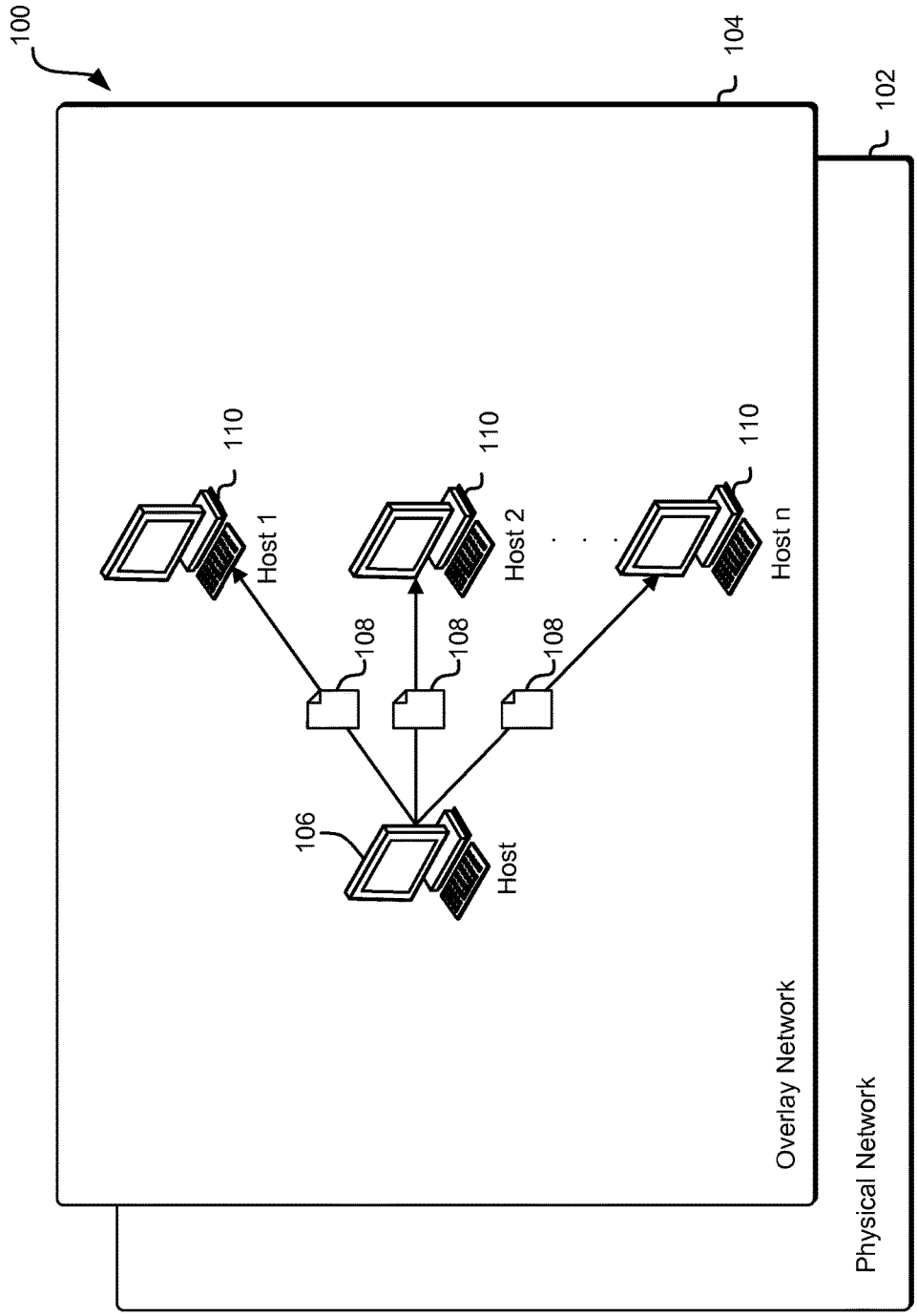
FIG. 1 shows an illustrative example of an environment in which various embodiments can be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the dynamic configuration of networks to operate in accordance with various network protocols. In some examples, techniques described and suggested herein apply to the configuration of an overlay network to enable use of protocols not completely supported by an underlying physical network substrate. In some embodiments, a dynamic overlay multicast network is configured. In an embodiment, an entity (e.g., an organization) may communicate with a virtual computer system service, such as through appropriately configured application programming interface (API) calls to the service, to request the configuration of a virtual machine instance. The entity may be a customer of a computing resource service provider that operates various services such as data storage services, object-level data storage services, virtual computing system services and/or database services. The virtual machine instance may contain a variety of applications. For instance, the virtual machine instance may comprise an operating system selected by the customer, a multicast participation application, and other applications that may be of use to the customer based on his or her needs. The multicast participation application may interface with software within the operating system to connect the virtual machine instance to a multicast network. In some embodiments, the virtual machine instance may be configured to operate as a network host.

In various embodiments, the multicast network may comprise a plurality of virtual machine instances configured to operate as network hosts. A customer that wants a virtual machine instance to participate in the multicast network may use a tag service provided by the virtual computer system service to modify a metadata tag associated with the virtual machine instance to specify that the instance is to participate in the multicast network. Accordingly, the instance may be configured to query a data storage system for this metadata tag by using, for instance, a multicast participation application to detect that the instance should participate in a multicast network, identify the multicast network and generate a connection to the multicast network.

In an embodiment, a network host may participate in a multicast neighborhood for the first time. In this circumstance, the multicast participation application may use information contained in the user-generated tag for the host and interface with software within the operating system to configure an Ethernet bridge to the specified neighborhood. An Ethernet bridge may, in some embodiments, be a device that may be used to connect a plurality of participant devices that may be located in remote locations together without the need of "line of sight" hardware. Once the Ethernet bridge has been established, the multicast participation application may create a point-to-point communication channel (e.g., tunnel) between the new participating network host and any other network hosts that are part of the specified neighborhood. This may enable any customer that is using a virtual machine instance as a member of the neighborhood to transmit a data packet to all the other network hosts in the neighborhood through the use of the newly configured tunnels.

After the network host has been integrated into the neighborhood, the multicast participation application may periodically monitor the neighborhood for any changes to the neighborhood. For instance, if a new network host sends a request to join the neighborhood through the use of the user-generated tag, the multicast participation application in each of the existing network hosts may query one or more data storage systems that may include an information source external to the network, such as a metadata service, and detect that a customer has specified that a new instance is to participate in the neighborhood. Accordingly, the multicast participation application in each network host in the neighborhood may configure a tunnel to the new participating virtual machine instance. This allows a customer to use a network host to deliver a data packet to all existing network hosts in the neighborhood, including any new network hosts added to the neighborhood since the last delivery or since the last query.

In addition, the multicast participation application of each network host in the neighborhood may monitor the metadata service to determine if any network host has been identified as one that should no longer be a participant and thus be removed from the multicast neighborhood. If the multicast participation application detects that a network host is to no longer be part of the neighborhood, the multicast participation application may de-configure the point-to-point tunnel to the network host and prevent any multicast data packets sent to the neighborhood from being delivered to the departing network host. Additionally, if the multicast participation application determines that the neighborhood has been dissolved or that the network host is the only one remaining in the neighborhood, the multicast participation application may de-configure the Ethernet bridge.

In this manner, a customer may use an instance to dynamically configure and manage a multicast network within a virtual computing system service. In addition, the techniques described and suggested herein facilitate additional technical advantages. For example, because, in some embodiments, the virtual machine instance includes a multicast participation application, a customer does not need to modify any other applications in order to participate in a multicast network. Additionally, in many embodiments, the configuration of each participant in the multicast network is automatic in a dynamically changing environment. This, in turn, may reduce the cost of any downtime, particularly for a customer that is in need of sending data to a set of ever changing recipients in a multicast network. Additional uses are also enabled by the various techniques described herein.

FIG. 1 shows an illustrative example of an environment 100 in which various embodiments may be practiced. In the environment 100, a physical network substrate 102 may provide the underlying architecture that is used to support, possibly among other things, a collection of virtual machine instances. Accordingly, the physical network substrate 102 may include a collection of computing resources that are collectively configured to implement one or more networks that overlay the physical network substrate 102. The physical network substrate may include, for example, server racks, server computing devices, routers, switches, and/or other devices, such as power supplies, battery backup devices, cooling devices and/or other devices. These devices may be located in different locations dependent on the organization of the virtual computing system service and its customers. Alternatively, these devices may be located within the same data center or data center room.

As illustrated in FIG. 1, the environment 100 includes an overlay network 104 implemented using the physical network 102. The overlay network 104 may include a plurality of participant devices operating as network hosts 106, 110 in the network. For instance, in this illustrative example, the overlay network 104 includes a network host 106 that transmits packets 108 to other network hosts 110 in the overlay network 104. In an embodiment, the network hosts 106, 110 are implemented as virtual machine instances operating on one or more physical hosts (e.g., participant devices) of the physical network 102. For example, a customer may utilize a virtual machine instance to transmit a data package to other interested users in the overlay network 104. A customer may be an organization that utilizes the virtual computer system service to transmit data packages as part of its business. Additionally, the interested users may also be organizations or individuals that utilize the virtual computer system service to interact with other organizations. It should be noted, however, that, while virtual machine instances (virtual machines) are used throughout for the purpose of illustration of particular embodiments, the techniques described herein are applicable in other circumstances, such as networks in which one or more or all network hosts are not virtualized. Further, in an embodiment, the packets 108 are Internet Protocol (IP) packets. However, while IP packets are used throughout for the purpose of illustration, the techniques herein are applicable to other communication protocols that may not necessarily utilize IP packets.

In an embodiment, the network hosts 106, 110 in the overlay network 104 are configured to communicate in accordance with an overlay multicast protocol and, in particular, in accordance with overlay multicast. In FIG. 1, for instance, the network host 106 transmits the same packet 108 to multiple hosts 110 in accordance with a multicast protocol. Each of the recipient hosts 110 may receive and process the received packet. As discussed in more detail below, the overlay network 104 may be dynamic. For instance, a network topology of the overlay network 104 may change over time to include additional network hosts, fewer network hosts, to change connectivity among hosts and/or in other ways. As discussed below, techniques of the present disclosure allow for efficient and effective techniques for updating the overlay network 104 in accordance with the changes made thereto.

Figure 2:
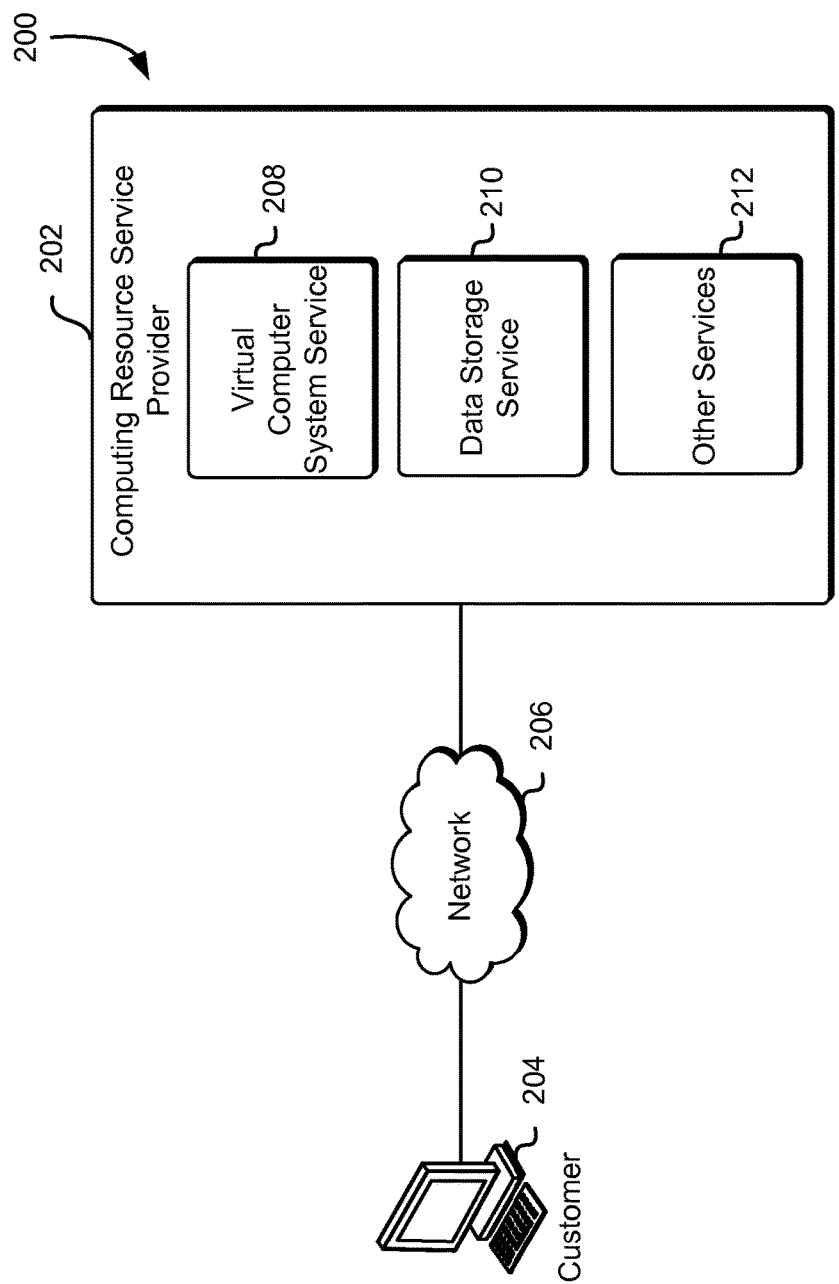
FIG. 2 shows an illustrative example of an environment in which various embodiments can be implemented.

FIG. 2 shows an illustrated example of an environment 200 in which various embodiments of the present disclosure may be practiced. In the environment 200, a computing resource service provider 202 may provide a variety of services to a customer 204. The customer 204 may be an organization that may utilize the various services provided by the computing resource service provider 202 to maintain and deliver information to its employees, which may be located in various geographical locations. Additionally, the customer 204 may be an individual that could utilize the various services to deliver content to a working group located remotely. As illustrated in FIG. 2, the customer 204 may communicate with the computing resource service provider 202 through one or more communications networks 206, such as the Internet. Some communications from the customer 204 to the computing resource service provider 202 may cause the computing resource service provider 202 to operate in accordance with various techniques described herein or variations thereof.

As noted above, a computing resource service provider 202 may provide various computing resource services to its customers. For instance, in this particular illustrative example, the computing resource service provider 202 provides at least two types of services. The services provided by the computing resource service provider, in this example, include a virtual computer system service 208, a data storage service 210, and one or more other services 212, although not all embodiments of the present disclosure will include all such services and additional services may be provided in addition to or as an alternative to services explicitly described herein.

The virtual computer system service 208 may be a collection of computing resources configured to instantiate virtual machine instances onto virtual computing systems on behalf of the customers 204 of the computing resource service provider 202. Customers 204 of the computing resource service provider 202 may interact with the virtual computer systems' service to provision and operate virtual computer systems that are instantiated on physical computing devices hosted and operated by the computing resource service provider 202. The virtual computer systems may be used for various purposes, such as to operate as servers supporting a website. Other applications for the virtual computer systems may be to support database applications, electronic commerce applications, business applications and/or other applications.

When a customer 204 interacts with the virtual computer system service 208 and provisions a virtual machine instance, the customer 204 may gain access to a variety of resources. For instance, a virtual machine instance may provision an operating system and a variety of applications depending on the customer's needs. Additionally, the virtual machine instance may contain a multicast participation application. This application may be used to deliver a data packet to a plurality of network hosts in an overlay multicast network. Additionally, the multicast participation application may interact with software within the operating system and the Ethernet bridge to locally replicate the data packet to be sent to a plurality of network hosts. This may cause each data packet to be received by each network host configured to receive one or more data packets from the multicast neighborhood.

In some embodiments, the multicast participation application may include instructions to periodically query a metadata service to determine whether a customer has opted to have a particular virtual machine instance instantiated on a physical host to participate in a multicast neighborhood. For instance, if a customer has specified that a virtual machine instance configured to operate as a network host is to participate in a multicast neighborhood, the customer may use a virtual computer system service management system to identify the multicast neighborhood it wants the network host to participate in. Consequently, the customer may modify a user-generated tag associated with the virtual machine instance to include the name of the neighborhood and the IP address of the network host within the multicast neighborhood. The IP address may need to be related to the multicast neighborhood such that the multicast participation application may query the user-generated tag and identify the neighborhood and identify the network host as a unique member of the multicast neighborhood. The multicast participation application may then interface with software within the operating system to create an Ethernet bridge to the multicast neighborhood and generate a series of connections to all other virtual machine instances configured to operate as network hosts in the multicast neighborhood. In this fashion, the customer utilizing a virtual computer system may utilize a network host to transmit a data packet to other interested recipients in a multicast neighborhood. Additionally, the network host may be configured to receive any data packets sent by any other network host in the neighborhood to the neighborhood at large.

Additionally, in some embodiments, the multicast participation application may monitor the existing multicast neighborhood to determine if a customer has created a change to the neighborhood. For instance, if the customer operates a network host that is configured to participate in the multicast neighborhood and a new virtual machine instance configured to operate as a network host has been assigned to participate in the neighborhood, the multicast participation application may configure a new connection with that new network host. This allows a customer utilizing a network host to deliver a data packet to all members of the multicast neighborhood, including the customer that introduced a new network host to the neighborhood. In addition, if the multicast participation application queries the metadata tag service and identifies that an existing network host in the neighborhood is to no longer take part in the multicast neighborhood, the multicast participation application may de-configure the connection to the departing network host and, if there are no other members remaining in the multicast neighborhood, the multicast participation application may utilize software within the operating system to de-configure the Ethernet bridge as well.

The data storage service 210 may comprise a collection of computing resources that collectively operate to store data for a customer 204. The data stored in the data storage service 210 may be organized into data objects. The data objects may have arbitrary sizes except, perhaps, for certain constraints on size. Thus, the data storage service 210 may store numerous data objects of varying sizes. The data storage service 210 may operate as a key value store that associates data objects with identifiers of the data objects which may be used by the customer 204 to retrieve or perform other operations in connection with the data objects stored by the data storage service 210. Access to the data storage service may be through appropriately configured API calls.

The computing resource service provider 202 may additionally maintain one or more other services 212 based on the needs of its customers 204. For instance, the computing resource service provider 202 may maintain a database service for its customers 204. A database service may be a collection of computing resources that collectively operate to run one or more databases for one or more customers 204. Customers 204 of the computing resource service provider 202 may operate and manage a database from the database service by utilizing appropriately configured API calls. This, in turn, may allow a customer 204 to maintain and potentially scale the operations in the database. Other services include, but are not limited to, object-level data storage services, object-level archival data storage services, services that manage other services and/or other services.

Figure 3:
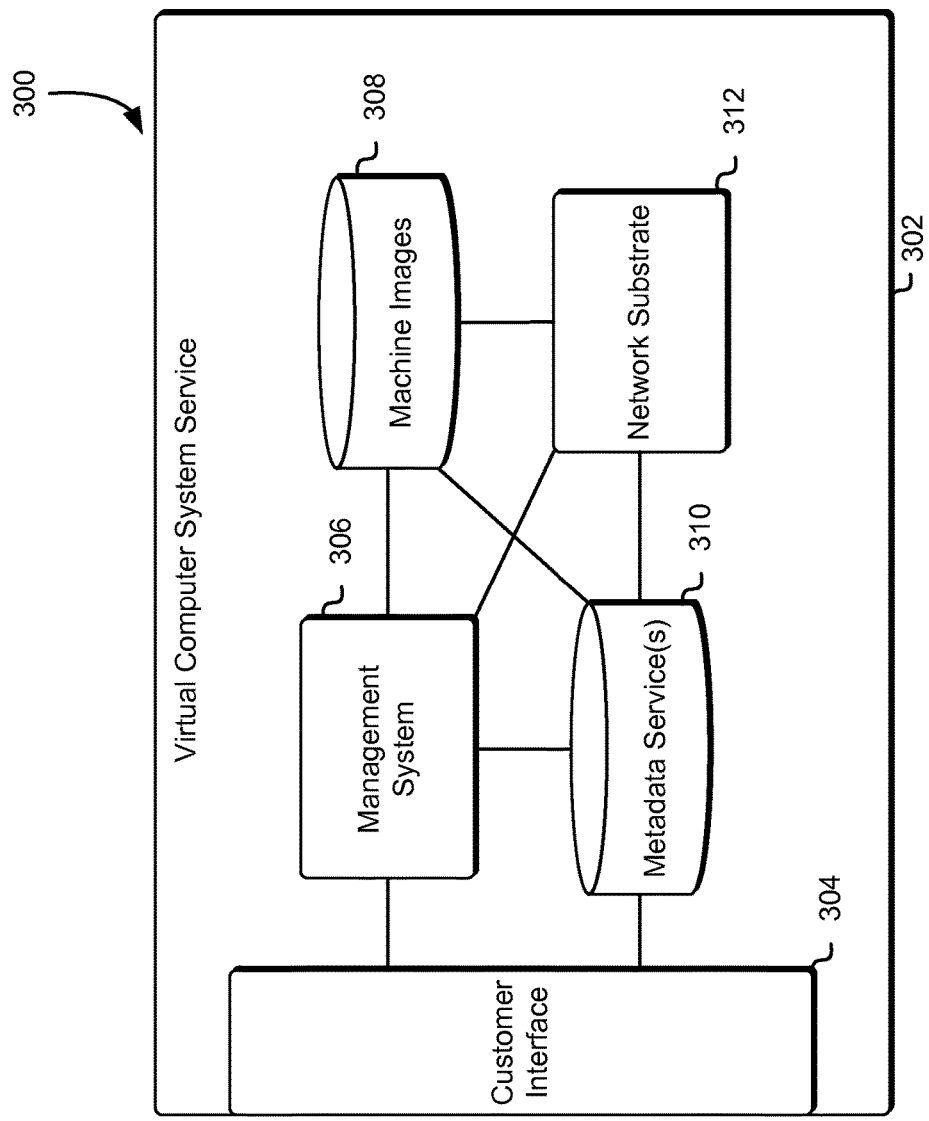
FIG. 3 shows an illustrative example of an environment in which various embodiments can be implemented.

As noted above, a virtual computer system service may be used by one or more customers to provision a virtual machine instance for a variety of uses. The virtual machine instance may permit a customer to access an operating system and a variety of applications that may enable a customer to perform certain functions (e.g., maintain one or more databases, store client information, develop web applications, etc.). Accordingly, FIG. 3 shows an illustrative example of an environment 300 that includes various components of a virtual computer system service 302 in accordance with at least one embodiment. The virtual computer system service 302 may provide customers with a customer interface 304 that may enable a customer to access the virtual computer system service 302. A customer may utilize the customer interface 304 through one or more communications networks, such as the Internet. The customer interface 304 may contain certain security safeguards to ensure that the customer has authorization to access the virtual computing system service 302. For instance, in order to access the virtual computer system service 302, a customer may need to provide a username and a corresponding password or encryption key when using the customer interface 304. Additionally, requests (e.g., API calls) submitted to the customer interface 304 may require an electronic signature generated using a cryptographic key such that the electronic signature is verifiable by the virtual computer system service 302, such as by an authorization system (not shown).

Once the customer has gained access to the virtual computer system service 302 through the customer interface 304, the virtual computing system service 302 may allow the customer to interact, through the customer interface 304, with a management system 306. For instance, the management system 306 may enable a customer to remotely provision a virtual machine instance. For instance, a customer may use the customer interface 304 and the management system 306 to generate an instance that includes an operating system and a variety of applications suited to the customer's needs. Additionally, the customer may generate a virtual machine instance in order to operate as a network host within a multicast network. The operating system and the various applications may be maintained in data storage in the form of machine images 308. The virtual computer system service 302 may maintain a variety of machine images 308 based on specific customer preferences, as specified in the management system 306. When a customer requests a virtual machine instance through the management system 306, the virtual computing system service 302 may identify the machine image the customer has requested and allocate the resources necessary (e.g., the processors and random-access memory (RAM) required to operate the components of the machine image) to process the machine image. The machine image may be instantiated on one or more physical storage devices (e.g., one or more servers or hard drives that may act as a physical host for the instance) that are connected to a network substrate 312.

After the instance has been created using a machine image 308, the management system 306 may assign a public domain name service (DNS) entry and a public IP address to the instance. This DNS entry may contain the public IP address for the instance and may be used by the customer to access the virtual machine instance from an outside network. The management system 306 may additionally assign a private IP address to each instance which can be used within the network substrate 312 of the virtual computer system service 302. For instance, the private IP address may not be used outside of the specific network substrate 312 and thus a data packet sent to the private IP address from an outside network (e.g., the Internet) would be denied delivery. However, an outside network may deliver a data packet to the customer through the use of the public IP address or a virtual private network (VPN) tunnel. In the latter instance, the customer may have established a VPN tunnel between computing resources managed by a service provider and resources managed by another entity (e.g., the customer). With the VPN tunnel in place, GRE or other point-to-point tunnels may be established between network hosts at the service provider and network hosts at the other entity. In this manner, devices hosted by multiple entities and at different geographic locations are able to participate in a multicast neighborhood.

The network substrate 312 within the virtual computer system service 302 may comprise a plurality of physical devices (e.g., servers, routers, switches and the like) that are used to implement the various instances created pursuant to instructions from the customers of the virtual computer system service 302. A multicast network may be implemented devices of the network substrate 312. A virtual machine instance of the multicast network may be configured to operate in accordance with executable instructions for delivering data packets to a plurality of other network hosts in the multicast network. The multicast network may be configured as an overlay multicast network. The overlay multicast network may dynamically update itself in accordance with one or more techniques discussed below.

To enable an overlay multicast network to update itself, the virtual computer system service 302 may maintain one or more metadata services 310 used to manage information determinative of whether a virtual computer instance configured to perform as network hosts should participate in one or more multicast networks, and to define the network topology. For instance, the metadata services 310 may include a tag service for maintaining the names of one or more multicast neighborhoods, the network hosts participating in the neighborhood, and the corresponding IP addresses for each network host participating in the multicast neighborhood. A customer may, though an appropriately configured API call to the customer interface 304, modify a tag within a virtual machine instance to specify which multicast neighborhoods the network host is to participate in and the IP addresses the network host may utilize within the multicast neighborhoods. For instance, if a multicast neighborhood utilizes particular IP addresses, the metadata tag may contain a unique IP address that identifies the network host as a member of the multicast neighborhood and its place among the other network hosts in the neighborhood. The management system 306 may also provide a mechanism for modifying the tag prior to instantiating a virtual machine instance such that when an instance is instantiated, the user-generated tag may be immediately applied to the virtual machine instance.

Figure 4:
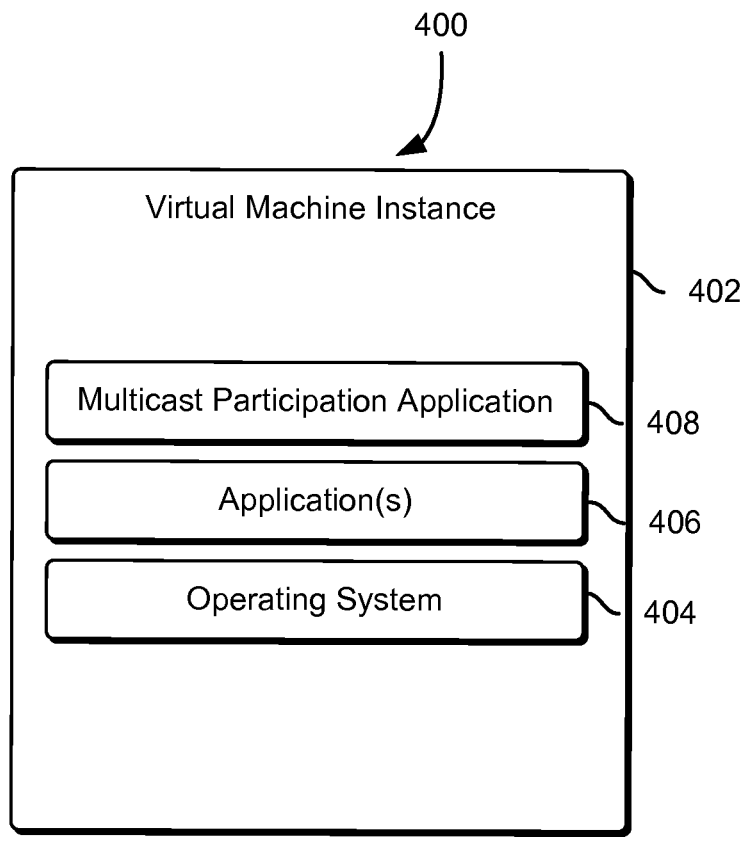
FIG. 4 shows an illustrative example of an environment in which various embodiments can be implemented.

As noted above, the virtual computer system service may allow a customer to utilize, through API calls to the customer interface 304, a management system to provision a virtual machine instance. FIG. 4 is an illustrative example of an environment 400 that includes various components of a virtual machine instance. In the environment 400, a virtual machine instance 402 has been initiated using the management system provided by the virtual computer system service as illustrated in FIG. 3. The virtual machine instance 402 may be instantiated in a physical device (e.g., a server or one or more hard drives configured to operate as a physical host for the virtual machine instance) depending on the customer's requirements. Each virtual machine instance 402 may comprise various software components. For example, as illustrated in FIG. 4, the virtual machine instance 402 may comprise three components: an operating system 404, one or more applications 406 based on customer specifications and a multicast participation application 408.

When a customer configures a virtual machine instance 402 using the management system, the customer may specify what operating system 404 should be used for his or her computing needs. For instance, each operating system may manage the underlying computer system hardware differently. Additionally, different operating systems may provide a customer with greater flexibility for programming new applications or for configuring a plurality of computer systems. A customer may also select a specific operating system based on its popularity with the greater public. For example, if a customer is a game developer and only has the resources to program a game for one operating system, the customer may select the most popular operating system to maximize the potential audience for the game. The virtual computer system service may maintain a variety of machine images based on different operating systems that are available to customers. Thus, when a customer initiates a virtual machine instance 402, the virtual computer system service may select a machine image with a specific operating system 404 that may be loaded onto a physical host.

The virtual machine instance 402 may include a variety of applications 406 that the customer may utilize. As noted above, each virtual machine instance 402 may include an operating system 404. The variety of applications 406 that may be included in the virtual machine instance 402 may need to be compatible with the selected operating system 404 in order to function properly. For example, certain applications 406 may be developed for a particular operating system 404 and follow that operating system's coding schema. Thus, if these applications 406 were introduced in a different operating system 404, it may be likely that these applications may not function properly or at all. However, there may exist a variety of similar applications 406 that serve the same purpose and may be used with different operating systems 404. A customer may thus specify what type of applications 406 he or she needs in the virtual machine instance 402 and the management system may select the appropriate applications 406 for the specified operating system 404.

In some embodiments, each virtual machine instance 402 may include a multicast participation application 408 in addition to the various customer specified applications 406. The multicast participation application 408 may be programmed to be compatible with each operating system 404 provided by the virtual computer system service. The multicast participation application 408 may allow the virtual machine instance to participate in a multicast network with a variety of other network hosts implemented by the physical network substrate of the virtual computer system service and/or with other network hosts. The multicast participation application 408 may thus communicate with the various multicast-enabled routers to ensure delivery of a data packet to the intended network host recipients. Alternatively, in the case of a multicast network involving network hosts within and outside of the virtual computer system service, the multicast participation application 408 may allow a customer to develop an overlay multicast network with the variety of network hosts that belong to the multicast network. In some examples, the multicast participation application 408 interfaces with software within the operating system 404 and an Ethernet bridge (not shown) to perform the replication of a data packet locally rather than allowing the replication of the data packet to occur within the various routers in the underlying physical network substrate.

The multicast participation application 408 may cause the virtual machine instance 402 to perform one or more operations involved in configuring a multicast neighborhood in an overlay multicast network. For instance, as illustrated in FIG. 3, a customer may, through an appropriately configured API call, update a metadata service through a management system to modify a user-generated, instance-specific tag. The metadata service may operate as a key-value store which stores, in association with the virtual machine instance, the name of a multicast neighborhood and the IP address for the virtual machine instance configured to operate as a network host within the neighborhood. The IP address may be specific to the multicast neighborhood. The virtual machine instance 402, pursuant to the multicast participation application 408, may query the metadata service to determine if there has been a change in the current state of the multicast neighborhood and, when a response from the metadata service so indicates, identify that the customer has specified a desired state for the multicast neighborhood. For instance, the customer may specify that it wants the virtual machine instance 400 to participate in the multicast neighborhood. If the multicast participation application 408 identifies that the network host is to participate in the multicast neighborhood for the first time, the multicast participation application 408 may interface with software within the operating system 404 to create an Ethernet bridge to the specified neighborhood. The Ethernet bridge may be configured to enable the creation of point-to-point communication channels (e.g., tunnels) to other network hosts within the multicast neighborhood. Once a connection has been established with the multicast neighborhood, the multicast participation application 408 may query the metadata service to identify other network hosts participating in the neighborhood and allow the creation of a point-to-point tunnel (such as a generic routing encapsulation (GRE) tunnel) to each network host. In this fashion, the virtual machine instance may operate as a network host that participates in multicast communications.

As noted above, if the network host is participating in the multicast neighborhood, the customer may have the ability to utilize the network host to send data packets addressed to a multicast IP address to all other neighborhood network hosts in the multicast neighborhood. Alternatively, if another network host in the multicast neighborhood is used to send a data packet addressed to a multicast IP address in the multicast neighborhood, the other participating network hosts may receive a copy of the data packet automatically. Accordingly, a customer may use the multicast participation application 408 to have the network host send a data packet to the neighborhood. The multicast participation application 408, through the management system or a different application 406, may receive the request from the customer and interface with software within the operating system 404 and the Ethernet bridge to locally replicate the data packet depending on the number of network hosts participating in the multicast neighborhood. For example, if the multicast neighborhood comprises ten other network hosts, the multicast participation application 408 may transmit a command to software within the operating system 404 and the Ethernet bridge to generate ten copies of the data packet and deliver each copy using the point-to-point tunnel between the sending network host and each other participating network host in the neighborhood.

The data packet that is to be delivered to the network hosts within the multicast neighborhood may be addressed to a multicast IP address, which may correspond to a multicast group. In this instance, as a result of the packet being addressed to a multicast IP address, the data packet may be replicated and delivered to each network host, as illustrated above. An application executing on a network host that receives the data packet may be configured to determine whether to process or ignore the data packet. Accordingly, if the network host is not part of the multicast group associated with the multicast IP address, the application in that recipient network host may ignore the data packet. Alternatively, if the network host is part of the multicast group, the application within the network host may accept and process the data packet.

In addition to allowing a customer to enable a network host to participate in a multicast neighborhood, the multicast participation application 408 may be used to remove a participating host from a multicast neighborhood. For instance, a customer may engage the metadata service through a management system to modify the user-generated, instance-specific tag by deleting or otherwise changing any strings associated with the one or more multicast neighborhoods that the network host is associated with. This may consist of deleting the name of the multicast neighborhood and the associated IP address of the network host within the neighborhood. Once this occurs, the multicast participation application 408 may interface with software within the operating system 404 to de-configure any existing point-to-point tunnels with other network hosts participating in the multicast neighborhood. Additionally, the multicast participation application 408 may de-configure the Ethernet bridge to the multicast neighborhood. Thus, the departing network host may no longer receive any data packets sent by any remaining participant network hosts to the multicast neighborhood. Alternatively, if the network host is still participating in the multicast neighborhood and the multicast participation application 408 identifies that another network host associated with the neighborhood is no longer a participant, the multicast participation application 408 may de-configure the existing point-to-point tunnel to the departing network host but maintain a connection to the remaining participating network hosts in the multicast neighborhood. Additionally, if the multicast participation application 408 detects that the network host is the last remaining participant in the multicast neighborhood, the multicast participation application 408 may de-configure the Ethernet bridge to the network and thus terminate the multicast neighborhood.

Figure 5:
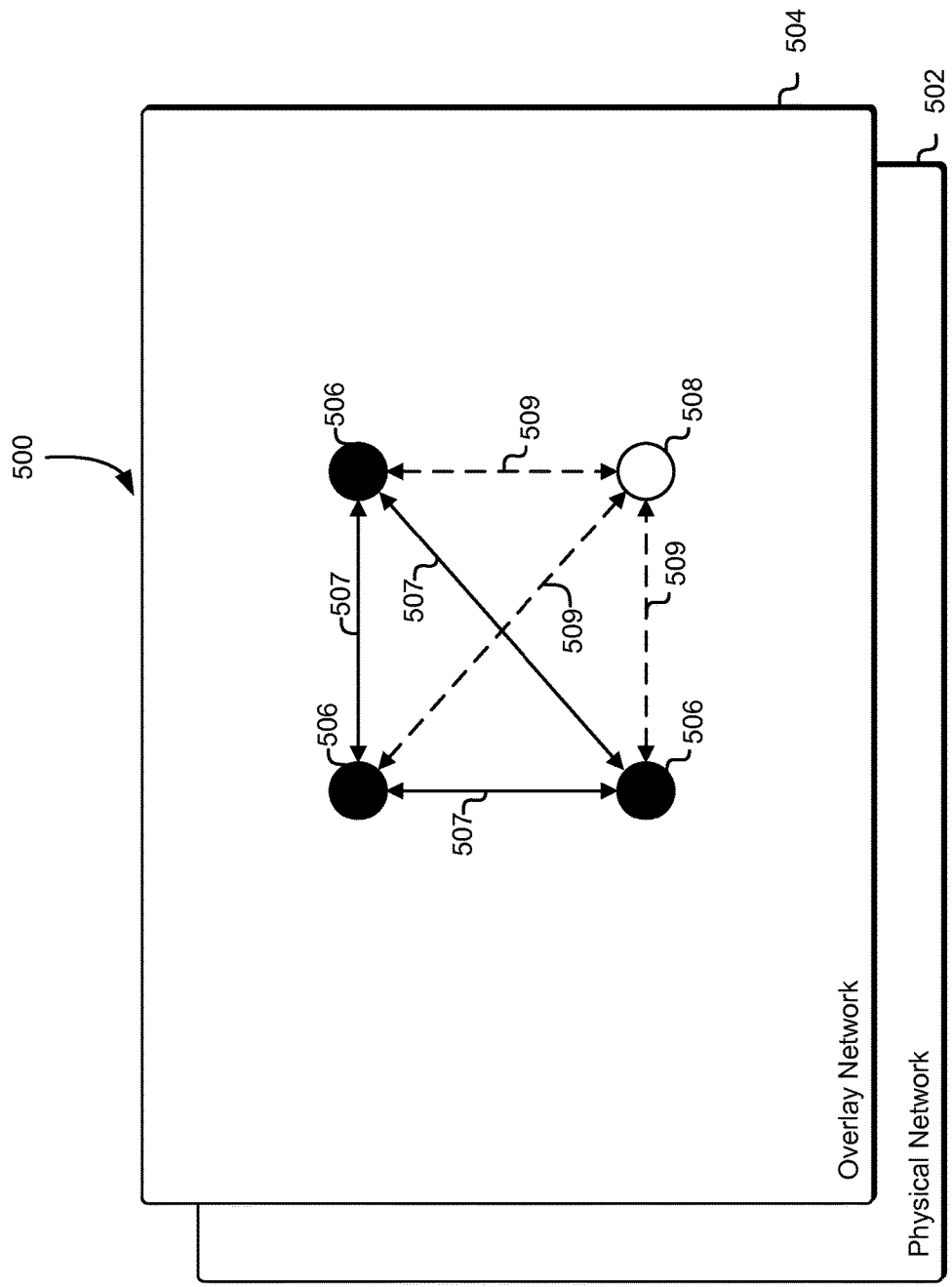
FIG. 5 shows an illustrative example of an environment in which point-to-point tunnels are generated for a new instance in accordance with at least one embodiment.

As noted above, when a customer has specified that a network host is to participate in a multicast neighborhood for the first time, the multicast participation application, interfacing with software within an operating system and an Ethernet bridge, may generate new point-to-point tunnels to each network host participating in the neighborhood. Accordingly, FIG. 5 is an illustrative example of an overlay multicast neighborhood in accordance with at least one embodiment. In the environment 500, a physical network substrate 502 may provide the underlying hardware configuration for the multicast network. As illustrated in FIG. 5, the physical network substrate 502 may comprise a variety of servers that may serve as a physical host to instantiate customer virtual machine instances and a series of routers that may be used to deliver a data packet from one physical host to another in the network. As noted above, in a traditional multicast environment, the router may be used to replicate a data packet and deliver a copy of the data packet to the intended recipient physical hosts. However, in the traditional multicast environment, all involved multicast routers may need to be part of the same administrative domain making it potentially difficult to configure properly.

To address potential issues that may arise in a traditional multicast network using a physical network substrate 502, the environment 500 may include one or more overlay multicast networks 504. As noted above, in an overlay multicast network, the data packet is replicated using software contained within the operating system in the virtual machine instance and an Ethernet bridge. As illustrated in FIG. 4, a customer utilizing a virtual machine instance configured to operate as a network host may use a multicast participation application to send a data package addressed to a multicast IP address to the neighborhood the network host is currently participating in. The multicast participation application may interface with software within the operating system and the Ethernet bridge to perform the replication of the data packet and deliver the data packet to each participating network host in the multicast neighborhood. Thus, since the replication of the data packet is performed locally, the multicast routers may no longer need to be part of the same administrative domain. There may be multiple overlay multicast networks that overlap the physical network substrate 502 such that an overlay network may be applied over an existing overlay network, ad infinitum.

Accordingly, a multicast neighborhood may exist in an overlay network 504. The multicast neighborhood may comprise a number of network hosts 506 that have been configured by one or more customers to participate in the neighborhood. Each network host 506, as noted above, may have had a user-generated tag modified in the metadata service by one or more customers to include the name of the multicast neighborhood they would like the network host to be a participant in and the corresponding IP address of the network host that may identify the network host within the multicast neighborhood. As part of the multicast neighborhood, each participant network host 506 may have the multicast participation application, or another application that operates similarly, configure a point-to-point tunnel 507 to each other participant network host 506 in the multicast neighborhood, creating a network mesh. Thus, if one participant network host 506 is instructed to send a data packet addressed to a multicast IP address to the multicast neighborhood, the multicast participation application contained in the existing multicast neighborhood network host's 506 virtual machine instance may interface with software within the operating system and the Ethernet bridge to replicate the data packet locally and transmit the data packet to each other network host 506 using the point-to-point tunnels 507. Consequently, each participant network host 506 may receive a data packet sent by any other participant network host 506 to the multicast neighborhood. As noted above, an application executing on a network host 506 that receives the data packet may be configured to determine whether to process or ignore the data packet. Accordingly, if the network host 506 is not part of the multicast group associated with the multicast IP address, the application in that recipient network host 506 may ignore the data packet. Alternatively, if the network host 506 is part of the multicast group, the application within the network host 506 may accept and process the data packet.

The multicast neighborhood created in the overlay network 504 may additionally accommodate any new network hosts that may have been configured by one or more customers to participate in the neighborhood. Thus, the environment 500 may include a new network host 508. As noted above, if a customer wants to configure a new network host 508 to participate in a multicast neighborhood, the customer may modify a user-generated tag for the new network host 508 in the metadata service to include the name of the neighborhood and the corresponding IP address the network host 508 may utilize within the multicast neighborhood. The multicast participation application contained in the virtual machine instance configured to operate as the new network host 508 may query the metadata service and determine the customer has configured the new network host 508 to be a participant in the multicast neighborhood. In this example, the new network host 508 has not been part of this multicast neighborhood before. This may require that the multicast participation application interface with the new network host's operating system to establish an Ethernet bridge to the multicast neighborhood.

Additionally, once the connection to the multicast neighborhood has been established, the multicast participation application contained in the virtual machine instance configured to operate as the new network host 508 may interface with software within the operating system to establish a point-to-point tunnel 509 to all existing multicast neighborhood network hosts 506. At the same time, the multicast participation application in each existing multicast neighborhood network host 506 may query the metadata service and detect that the new network host 508 has joined the multicast neighborhood. Subsequently, the multicast participation application installed on each network host may configure a point-to-point tunnel 509 between each existing multicast neighborhood network host 506 and the new network host 508.

Once the point-to-point tunnels 509 have been generated between the existing multicast neighborhood network hosts 506 and the new network host 508, any participant network host in the neighborhood may be instructed to transmit a data packet addressed to a multicast IP address to each other participant network host in the neighborhood. Accordingly, the multicast participation application in the virtual machine instance configured to operate as the sending network host may interface with software within the operating system and the Ethernet bridge to replicate the data packet according to the number of other network hosts in the neighborhood. If a customer has specified that a network host 506 is to no longer participate in the multicast neighborhood, the multicast participation application may interface with the operating system to de-configure the existing point-to-point tunnels 507 to all the other network hosts. Accordingly, the multicast participation application installed on all the other network hosts in the multicast neighborhood may query the metadata service and detect that a network host is lacking from the response to the query (e.g., the network host is no longer part of the neighborhood) and proceed to de-configure the point-to-point tunnels 507 to the departing network host. Thus, the replication process may be performed dynamically as network hosts enter and leave the multicast neighborhood.

Figure 6:
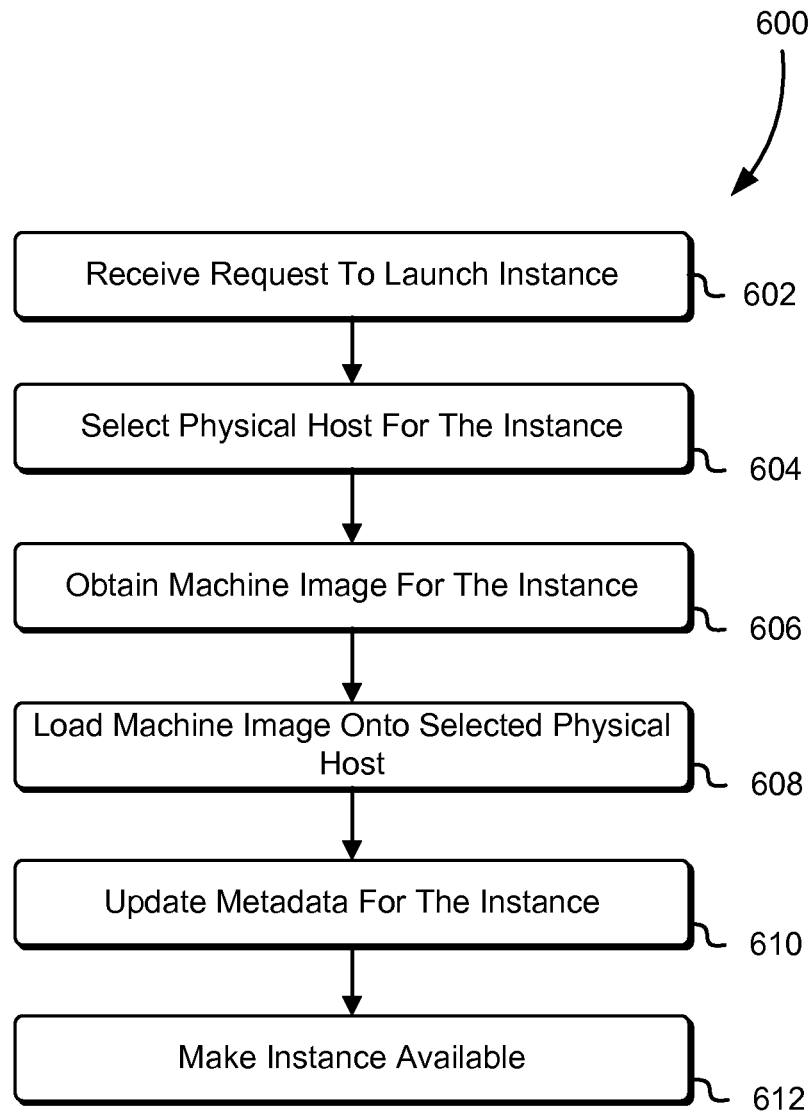
FIG. 6 shows an illustrative example of a process for generating an instance in accordance with at least one embodiment.

FIG. 6 is an illustrative example of a process 600 for allowing a customer to launch a virtual machine instance in accordance with at least one embodiment. In the process 600, a virtual computing system service may receive 602 a request from a customer to launch a virtual machine instance. The request may be received through appropriately configured API calls to the service. For example, as illustrated in FIG. 3, the customer may utilize a customer interface to request the virtual machine instance. As noted above, the customer requesting to launch a virtual machine instance may specify an operating system and a series of applications that the customer may need to perform a task. For example, a customer may require a specific operating system to configure and test a new application that is to be marketed and sold to users of the specific operating system. Additionally, the applications needed by the customer may only be available for a particular operating system.

After the virtual computer system service has processed a customer's request to launch a virtual machine instance, the virtual computer system service may select 604 a physical host to instantiate the virtual machine instance. The physical host may comprise, for instance, a variety of servers or hard drives dependent on the requirements of the virtual machine instance. Additionally, the physical host may provide a means for the customer to persistently store data created while utilizing the virtual machine instance. Thus, a customer may terminate the virtual machine instance and still have access to data generated during any session. In order for the virtual computer system service to select 604 a physical host for the instance, it must gauge the system requirements for the operating system and applications the customer has specified. For instance, if a customer has selected an older version of an operating system with sparse applications to support the instance, the virtual computer system service may select a physical host that comprises fewer resources but is capable of satisfying the customer's requirements. Subsequently, this may save the virtual computing system service and the customer some expense as unnecessary resources are not being expended. Alternatively, if a customer has selected the latest operating system and resource-intensive applications, the virtual computer system service may select a physical host that comprises numerous servers and/or hard drives. These servers and/or hard drives may be configured such that they operate as one entity.

As illustrated in FIG. 4, a virtual machine instance may comprise an operating system, one or more applications based on the customer's requirements, and a multicast participation application. These components may be installed on a machine image that is maintained by the virtual computer system service. The virtual computer system service may utilize a data storage service to maintain all the machine images it provides to its customers. Accordingly, the process 600 may include obtaining 606 a machine image for the instance. The virtual computer system service may store a series of machine images that comprise one or more of a combination of an operating system and the applications a customer has specified for the instance. Thus, the virtual computer system service may obtain the appropriate machine image from the data storage service and transfer it to the virtual computer system service for implementation into the instance.

Accordingly, after the virtual computer system service has obtained the machine image for the instance, the process 600 may include loading 608 the machine image onto the selected physical host. As noted above, the virtual computer system service may select 604 a physical host for the instance based on the system requirements of the operating system and applications specified by the customer. Thus, the machine image containing the operating system and the applications specified by the customer may be loaded onto the one or more servers and/or hard drives that comprise the physical host. The selected physical host may be optimized for the machine image and thus installation of the machine image may not require a substantial amount of time.

Once the machine image has been loaded onto the one or more servers and/or hard drives that comprise the selected physical host, the virtual computer system service may update 610 the metadata for the instance. As noted above, a customer may specify that the virtual machine instance configured to operate as a network host is to participate in a multicast neighborhood. Accordingly, the customer may utilize the management system within the virtual computer system service to modify a user-generated tag such that it includes the name of the multicast neighborhood and a specific IP address that is to be used by the network host within the multicast neighborhood. The IP address may need to be specific to the multicast neighborhood and may need to be unique within the group. Additionally, the customer may use the management system to apply a variety of tags to the virtual machine instance. For example, the customer may apply a name to the virtual machine instance that is simple to remember for future use or for the benefit of other delegate users that may have access to the virtual machine instance. Once the customer has provided the strings to be applied to the tag, the management system may interact with the metadata service to update all metadata tags for the instance.

The virtual computer system service may make 612 the instance available to a customer once the process 600 has incorporated the updated tags to the instance. As noted above, the management system may assign a public DNS entry and a public IP address for the instance. Additionally, the management system may assign a private IP address to the instance which can be used within the virtual computer system service. The customer may be able to access the instance remotely using the public IP address. Once the customer has gained access to the instance, the customer may use the host to now participate in a multicast neighborhood. Additionally, the customer may use the management system at any time to update the metadata tag to include any multicast neighborhood the customer opts to have the network host be a participant in.

Figure 7:
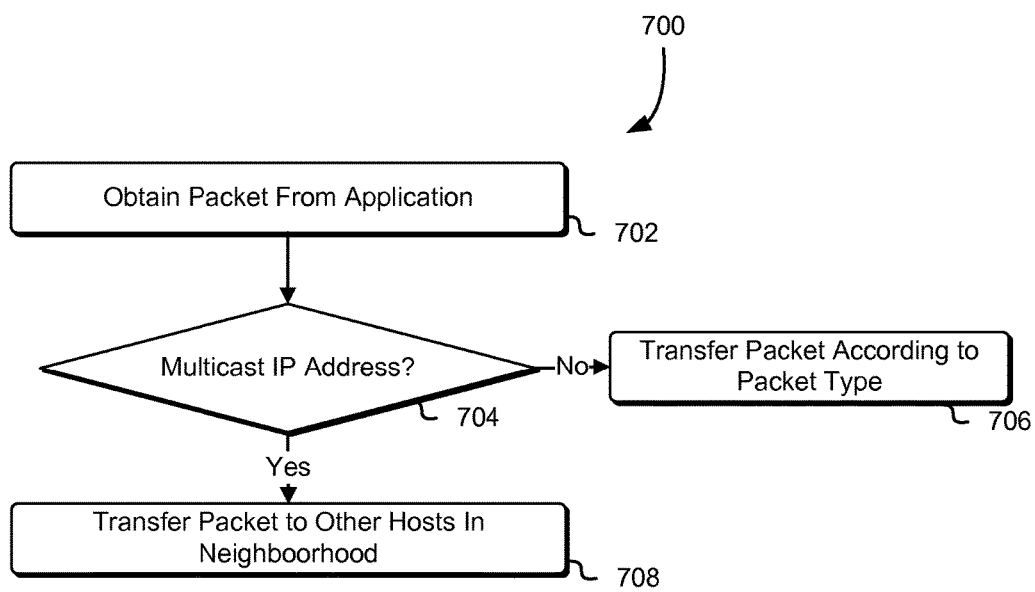
FIG. 7 shows an illustrative example of a process for transferring a data packet in accordance with at least one embodiment.

As noted above, a customer may utilize a virtual machine instance configured to operate as a network host to deliver a data packet to another network host in the multicast network or to a number of network hosts configured to participate in a multicast neighborhood. Accordingly, FIG. 7 is an illustrative example of a process 700 for delivering a data packet to one or more network hosts in accordance with at least one embodiment. A customer may utilize an application within the virtual machine instance to generate a data packet. For instance, the customer may prepare a document within a word processing application that may need to be reviewed by other entities within and outside of the network. Thus, when creating the data packet, the customer may indicate who the intended recipients are in the network. For instance, the customer may specify that the data packet is to be delivered to a colleague in a remote location. Alternatively, the customer may specify that the data packet is to be delivered to an extensive working team with members located around the world. The data packet may contain in its metadata the IP address of the intended one or more recipients. Accordingly, the process 700 may include obtaining 702 a data packet from the application for delivery to one or more intended recipients. The virtual computer system service may utilize an application within the operating system to handle the data packet once it has determined that it is to be delivered to one or more entities. Alternatively, the virtual computer system service may utilize a multicast participation application to handle the data packet if it is to be sent to a multicast neighborhood.

Accordingly, the process 700 may determine 704 whether the data packet contains in its metadata an IP address corresponding to a multicast IP address. If the customer is participating in a multicast neighborhood, the customer may have the option to instruct the virtual machine instance to deliver the data packet to the multicast neighborhood or to other network hosts that are not necessarily part of the multicast neighborhood. For instance, the customer, although he or she may have configured the virtual machine instance to operate as a network host in a multicast neighborhood, may generate a data packet and address the data packet to another entity that is not associated with the multicast neighborhood or to an entity that is associated with the multicast neighborhood but address the data packet to a unicast address. Thus, in some instances, the data packet may not contain the destination multicast IP address. In such a situation, the process 700 may include transferring 706 the data packet to another entity according to the packet type.

If the customer has configured the virtual machine instance to operate as a network host and as a participant in a multicast neighborhood, the customer may update the metadata for the data packet such that it may contain the destination multicast IP address. Accordingly, the process 700 may transfer 708 the data packet to the other network hosts participating in the multicast neighborhood. As noted above, a customer may identify one or more multicast neighborhoods that the network host should be a participant in by modifying a metadata tag associated with the virtual machine instance. For example, as illustrated in FIG. 3, the customer may use a management system within the virtual computer system service to modify the metadata tag associated with the instance. The customer may include a data string with the name of the multicast neighborhood and a specific IP address for the network host within the neighborhood.

If the data packet contains a multicast IP address, the data packet may be transferred to a multicast participation application for delivery to the other network hosts within the multicast neighborhood. The multicast participation application may interact with software within the operating system and the Ethernet bridge to replicate the data packet depending on the number of other network hosts within the multicast neighborhood. Thus, if the customer has configured the virtual machine instance to operate as a network host and the customer has specified that the network host is to participate in a multicast neighborhood, the customer may have a data packet delivered to each network host in the neighborhood. An application executing on a network host that receives the data packet may be configured to determine whether to process or ignore the data packet. Accordingly, if the network host is not part of the multicast group associated with the multicast IP address, the application in that recipient network host may ignore the data packet. Alternatively, if the network host is part of the multicast group, the application within the network host may accept and process the data packet.

Figure 8:
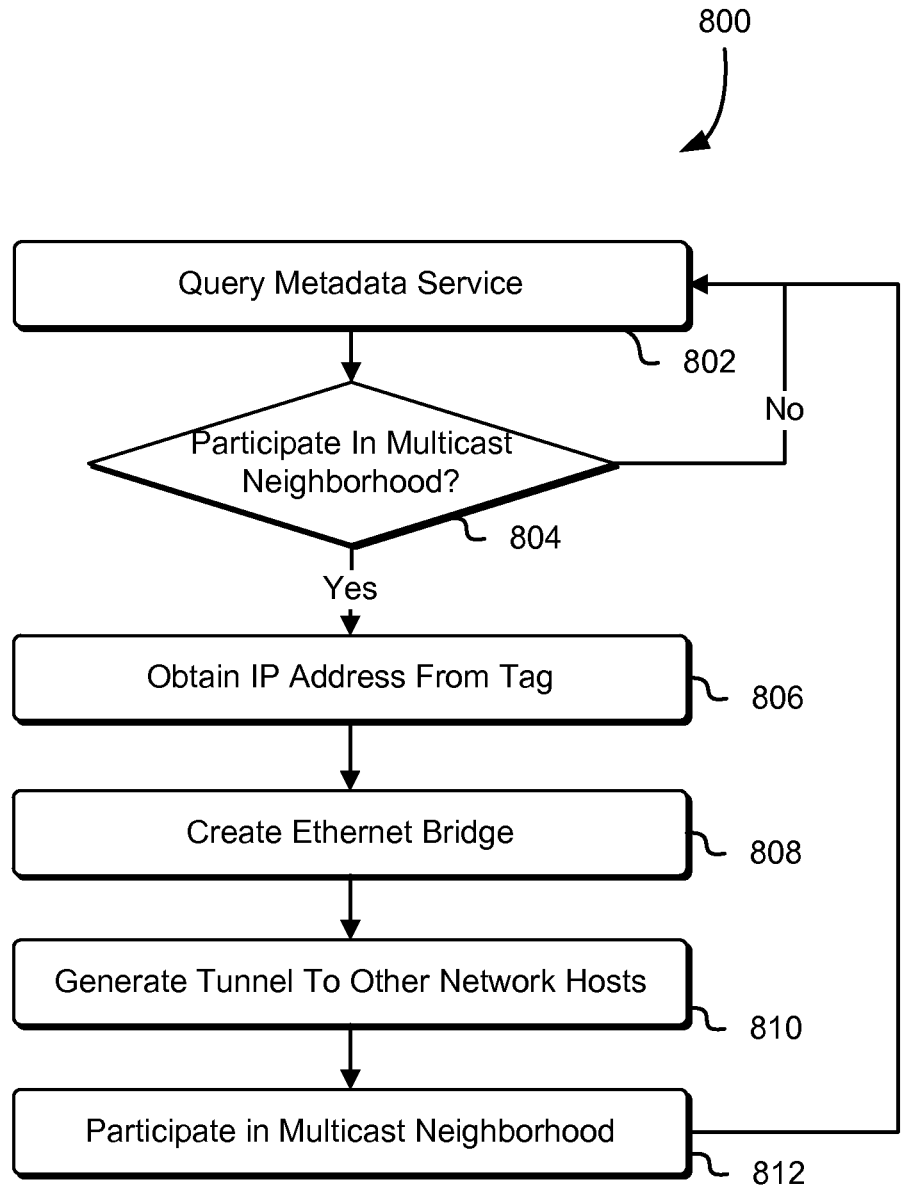
FIG. 8 shows an illustrative example of a process for configuring a multicast with other hosts in accordance with at least one embodiment.

FIG. 8 is an illustrative example of a process 800 for establishing a connection to a multicast neighborhood for the first time in accordance with at least one embodiment. As noted above, a customer may utilize a management system to modify a metadata tag associated with the virtual machine instance. For instance, the customer may include a string within the user-generated tag to provide a name to the virtual machine instance. Additionally, the customer may include a string with the name of a multicast neighborhood and include a string providing a specific IP address for the network host that is to participate in the multicast neighborhood. Thus, the process 800 may include querying 802 the metadata service to determine what actions should be taken with regard to the network host. Using the example above, if the metadata tag includes a string that provides a name to the virtual machine instance, the process 800 may further associate the instance by that name. This new name may be visible to others outside of the network or any delegate users as specified by the customer.

Once the process 800 has queried the metadata service for all tags associated with the network host, it may evaluate whether the network host is to participate 804 in a multicast neighborhood. If the metadata tag does not contain any multicast neighborhood information, the process 800 may include submitting a query 802 to the metadata service periodically until the customer provides a multicast neighborhood name and a specific IP address for the network host that is to be used within the multicast neighborhood. If after periodic query the customer modifies the metadata tag to include a multicast neighborhood name and specific network host IP address for use within the multicast neighborhood, the process 800 may include configuring the network host for access to the specified multicast neighborhood. While periodic querying of the metadata service is used throughout for the purpose of illustration, the techniques herein are applicable to other forms of querying that may not necessarily utilize periodic querying of the metadata service. For instance, the process 800 may include submitting multiple queries over a programmed time period. In another embodiment, a change made to the metadata tag may be pushed to the devices in the network.

The IP address that may be included in the metadata tag, as noted above, may be specific to a multicast neighborhood. Additionally, the IP address may be a specific address for the network host within the multicast neighborhood. Thus, the IP address may provide sufficient information to identify the network host among the various network hosts that may be participating within the neighborhood. Accordingly, the process 800 may include obtaining 806 the IP addresses for all the network hosts in the neighborhood from the metadata tags. As noted above, a multicast participation application may interface with software within the operating system to configure the virtual machine instance such that it operates as a network host in the multicast neighborhood. Thus, the multicast participation application may utilize the IP addresses to establish the connection to the neighborhood, establish the network host's identity within the neighborhood and identify all other network hosts participating in the multicast neighborhood.

As illustrated in FIG. 4, the multicast participation application may interface with software within the operating system to establish a connection with the multicast neighborhood. Accordingly, the process 800 may include creating 808 an Ethernet bridge. When a customer has opted to configure the virtual machine instance to operate as a network host in a multicast neighborhood for the first time, a series of connections may need to be established between the network host and the neighborhood. After the multicast participation application obtains the name of the multicast neighborhood and an IP address of the network host for use within the multicast neighborhood, the multicast participation application may interface with software within the operating system to establish an Ethernet bridge to the neighborhood. The Ethernet bridge may be used to replicate a data packet for delivery to the one or more multicast neighborhood network hosts and allows the network host to receive any traffic from the multicast neighborhood.

Once the Ethernet bridge has been established, the process 800 may include generating 810 a tunnel between the network host and any other network hosts participating in the multicast neighborhood. In order to establish a tunnel with another network host, the multicast participation application, after querying the metadata service and detecting that the customer has specified that the network host is to participate in the multicast neighborhood, may identify the other network hosts that belong to the multicast neighborhood. For instance, the metadata tag used by all other virtual machine instances configured to operate as network hosts in the multicast neighborhood may contain the same data string that identifies the multicast neighborhood that each network host is a participant in and a corresponding IP address for the specific network host for use within the neighborhood. Thus, if the string identifying the name of the multicast neighborhood matches, the multicast participation application may include determining the number of tunnels necessary to establish a connection to each network host within the multicast neighborhood. This process may result in the generation of a network mesh within the multicast neighborhood.

Accordingly, the customer may use the new network host to participate 812 in the multicast neighborhood using the point-to-point tunnels that may have been generated between the network host and the plurality of other network hosts within the multicast neighborhood. The customer may now use the new network host to send a data packet and the multicast participation application may interface with software within the operating system and the Ethernet bridge to replicate the data packet. Subsequently, the multicast participation application may be configured to deliver each copy of the data packet to the plurality of network hosts participating in the neighborhood if the data packet is addressed to a multicast IP address. In addition, the new network host may also now receive any data packet delivered to the multicast neighborhood by any participating network host if the data packet contains a multicast IP address. As noted above, an application executing on a network host that receives the data packet may be configured to determine whether to process or ignore the data packet. Accordingly, if the network host is not part of the multicast group associated with the multicast IP address, the application in that recipient network host may ignore the data packet. Alternatively, if the network host is part of the multicast group, the application within the network host may accept and process the data packet. The multicast participation application may be configured to periodically or otherwise query 802 the metadata to determine whether the customer has specified any changes to the network host.

Figure 9:
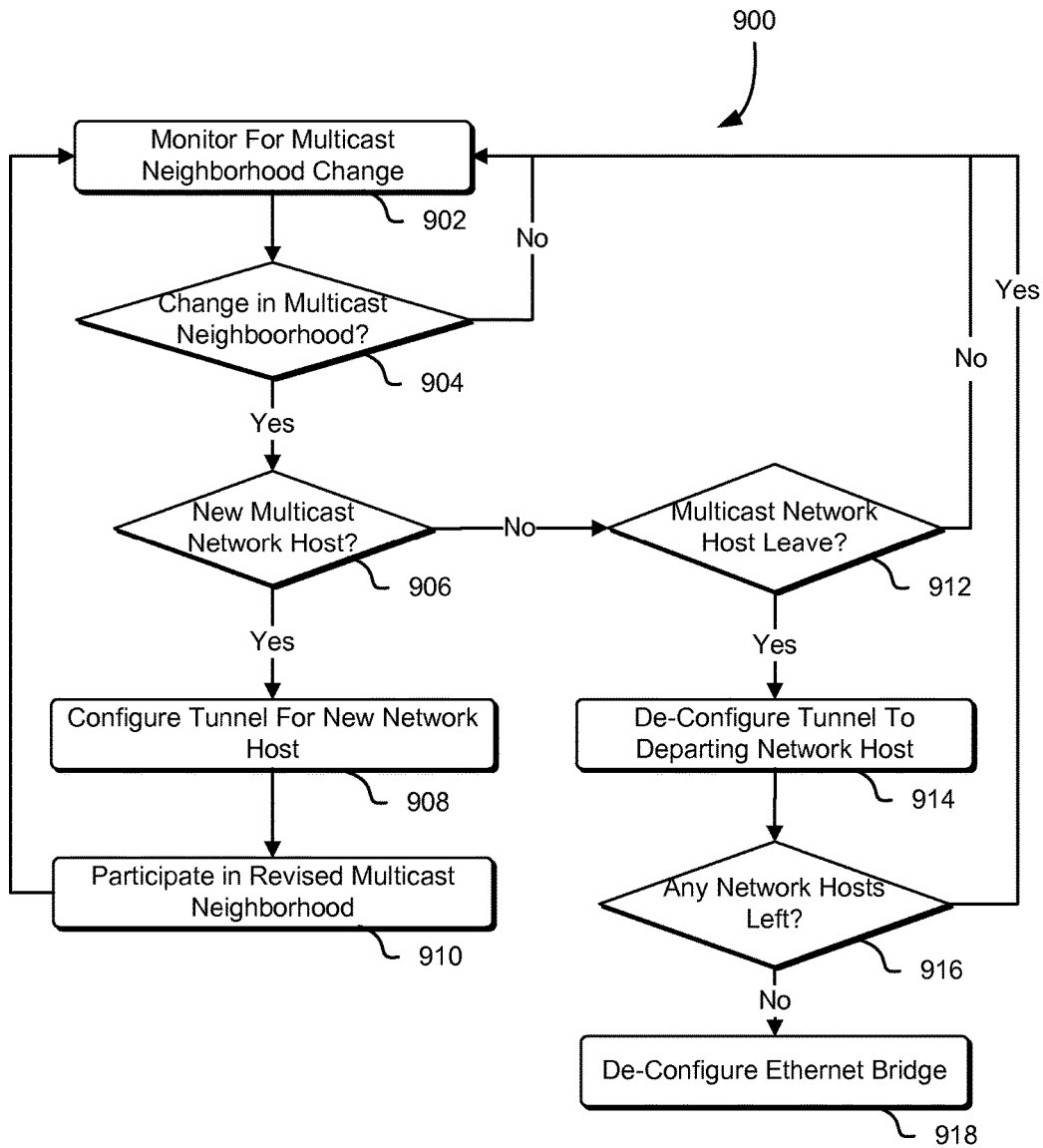
FIG. 9 shows an illustrative example of a process for addressing a change in a multicast neighborhood in accordance with at least one embodiment.

As a participant in the multicast neighborhood, the customer may now use the new network host to send and receive any multicast neighborhood traffic. Additionally, as a participant in the neighborhood, the new network host may be configured to adapt to any changes in the multicast neighborhood. Thus, FIG. 9 is an illustrative example of a process 900 for dynamically adapting to any changes that may occur in the multicast neighborhood in accordance with at least one embodiment. In order for a participating network host to be configured to adapt to any changes that may occur in the multicast neighborhood, the network host may be configured to monitor 902 the multicast neighborhood to determine whether there have been any changes to the neighborhood. Each customer that has configured a participating network host may utilize a multicast participation application to determine if any changes have occurred in the neighborhood. For instance, the multicast participation application may be configured to query the metadata service at regular intervals to determine if one or more customers have modified any network host tags since the last query. Generally, the multicast participation application may receive notifications of changes to the multicast neighborhood, whether in response to a query and/or notifications that are pushed to the multicast participation application. The interval used may be a small amount of time, such as every sixty seconds, to ensure changes to the neighborhood are captured and implemented with minimal impact to the multicast neighborhood.

Accordingly, the multicast participation application in the participating network host may be configured to determine 904 whether there has been any change in the multicast neighborhood. If the multicast participation application does not detect a change in the multicast neighborhood, the multicast participation application may continue to monitor 902 the neighborhood for any changes. As noted above, this may involve querying the metadata service to determine whether any network host tags have been modified since the last query was performed. However, if the multicast participation application identifies a change in the multicast neighborhood, the multicast participation application may determine what change was made to the neighborhood and act accordingly.

The multicast participation application may be configured to first evaluate the change in the multicast neighborhood to determine 906 whether a customer has indicated that the network host is to participate in the multicast neighborhood. As illustrated in FIG. 8, when a customer has specified, through the use of a metadata tag, that a new network host is to participate in a multicast neighborhood, the multicast participation application may be configured to interface with software within the operating system to establish an Ethernet bridge to the multicast neighborhood. At this point, the new network host may contain certain instructions to configure point-to-point tunnels to each participating network host in the multicast neighborhood. From the perspective of the participating network host, the multicast participation application within the participating network host may be configured to receive a request from the new network host to establish a point-to-point tunnel. Thus, if the multicast participation application has detected a new network host in the multicast neighborhood, the multicast participation application may be configured to interface with software within the operating system to configure 908 a point-to-point tunnel to the new network host. As illustrated in FIG. 5, this may occur with each network host that has been configured to participate in the multicast neighborhood such that the network mesh is expanded to include the new network host.

Once the point-to-point tunnels have been configured between the new network host and the existing participating network hosts in the multicast neighborhood, the one or more customers may utilize each network host to participate 910 in the revised multicast neighborhood. For instance, a customer may now utilize the multicast participation application configured to operate the network host to send a data packet addressed to a multicast IP address to the multicast neighborhood. The multicast participation application may be configured to interface with software within the operating system and the Ethernet bridge to replicate the data packet based on the number of current network hosts configured to participate in the multicast neighborhood and deliver the data packet to each network host using the point-to-point tunnels. Subsequently, each participating network host in the multicast neighborhood may receive a data packet sent by any network host in the multicast neighborhood. As noted above, an application executing on a network host that receives the data packet may be configured to determine whether to process or ignore the data packet. Accordingly, if the network host is not part of the multicast group associated with the multicast IP address, the application in that recipient network host may ignore the data packet. Alternatively, if the network host is part of the multicast group, the application within the network host may accept and process the data packet.

If the change to the multicast neighborhood does not involve a new network host that a customer has specified to participate in the multicast neighborhood, the multicast participation application may determine 912 whether a current participating network host in the multicast neighborhood has been identified by a customer as no longer being a participant in the neighborhood. For instance, a customer that has configured a participating host in the multicast neighborhood may have used the management system to modify the metadata tag to indicate that the network host is to no longer be a participant in the neighborhood. This may involve deleting the name of the multicast neighborhood and the specific IP address used to identify the network host for the purpose of participating in the neighborhood. Thus, the multicast participation application may be configured to compare an older version of the departing network host's metadata tag and the current version of the tag to determine that the a customer has opted to have a network host no longer participate in the multicast neighborhood.

If the multicast participation application does not determine that a customer has opted to remove the network host from the multicast neighborhood, the multicast participation application may be configured to continue to monitor 902 the multicast neighborhood to determine if there are any other changes to the neighborhood. As noted above, the multicast participation application may be configured to query the metadata service at regular intervals to identify a change in the multicast neighborhood. The multicast participation application may determine other changes to the neighborhood and may perform a variety of actions to address the change in the neighborhood.

Once the multicast participation application has determined that a customer has opted to have a network host no longer participate in the multicast neighborhood, the multicast participation application may be configured to interface with software in the operating system and the Ethernet bridge to de-configure 914 the point-to-point tunnel to the terminated network host. As noted above, once the point-to-point tunnel has been severed, the departing network host may be unable to receive any more multicast traffic from any of the remaining participating network hosts. Additionally, the multicast participation application within the departing network host may contain instructions to de-configure the Ethernet bridge to the multicast neighborhood. The end result may be that the multicast neighborhood mesh is reduced by the number of point-to-point tunnels associated with the departing network host.

As a result of de-configuring the point-to-point tunnel to the departing network host, the multicast participation application may be configured to examine the resulting multicast neighborhood structure to determine what connections remain. Accordingly, the multicast participation application may be configured to determine 916 whether there are any participating network hosts remaining in the multicast neighborhood. If there are any remaining participating network hosts in the multicast neighborhood, the multicast participation application may continue to process any incoming or outgoing data packets and monitor 902 for any further changes in the multicast neighborhood. As noted above, the multicast participation application may be configured to query the metadata service at regular intervals to determine any changes to the metadata tags of each remaining network host.

A multicast neighborhood that comprises only one network host may not contain any point-to-point tunnels to other network hosts and thus may serve no multicasting purpose. Thus, if the multicast participation application has determined that there are no other participating network hosts remaining, the multicast participation application may be configured to interface with software within the operating system to de-configure 918 the Ethernet bridge between the network host and the multicast neighborhood. The multicast participation application may additionally be configured to modify the metadata tag to eliminate the name of the multicast neighborhood and associated IP address of the network host within the multicast neighborhood without customer input. Alternatively, the multicast participation application may be configured to leave the metadata tag unaltered in order to preserve the possibility of re-establishing the multicast neighborhood should a customer configure another network host to participate in the multicast neighborhood. Other variations of the process 900 and other processes described herein are considered as being within the scope of the present disclosure. For example, as noted above, the multicast participation network may be configured to determine other changes to the multicast neighborhood that may result in certain actions being taken by the network host. For instance, a network host may be configured to participate in a multicast neighborhood but be denied access to deliver a data packet to a second network host participating in the multicast neighborhood.

Figure 10:
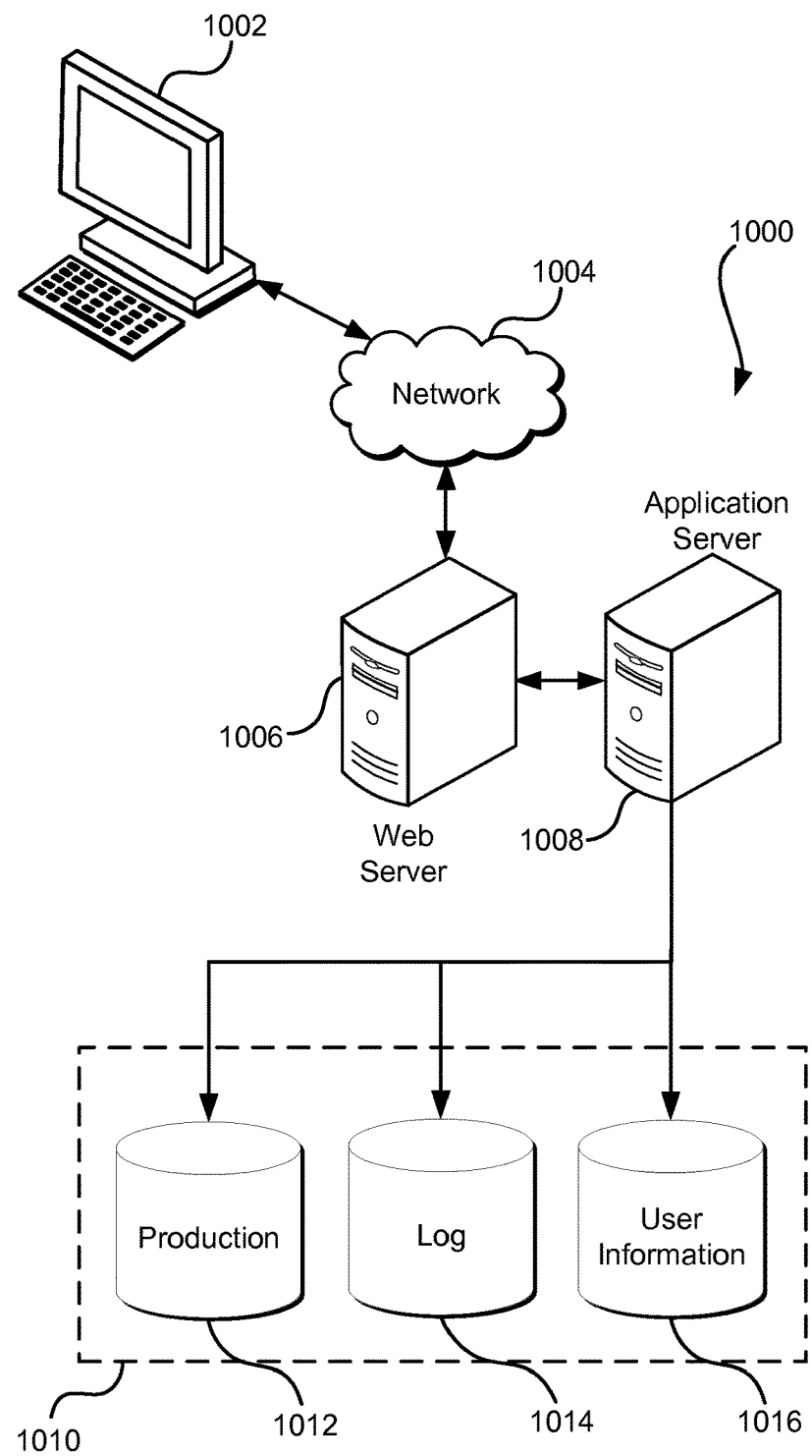
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1010 can include several separate data tables, databases or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system comprising:
    a collection of computing resources that implement an overlay multicast network, the overlay multicast network comprising a plurality of virtual machine instances, the plurality of virtual machine instances specified in information of a data storage system as defining a network topology of the overlay multicast network, and wherein each virtual machine instance of the plurality of virtual machine instances is configured to:
        submit a query to the data storage system;
        receive a response to the query that is based at least in part on the information defining the network topology of the overlay multicast network; and
        on a condition that the response indicates a desired state of the network topology of the overlay multicast network that is different than a current state of the network topology of the overlay multicast network, update the network topology to the desired state at least by establishing a point-to-point communication channel using generic routing encapsulation (GRE) protocol to a new virtual machine instance identified in the response to the query.

2. The system of claim 1, wherein:
    the collection of computing resources are hosted by a service provider; and
    the plurality of virtual machine instances are hosted by the service provider on behalf of a customer of the service provider.

3. The system of claim 1, wherein:
    the information stored by the data storage system is metadata of the collection of computing resources;
    the metadata includes user-generated tags of the collection of computing resources; and
    the user-generated tags collectively include the information defining the network topology of the overlay multicast network.

4. The system of claim 3, wherein:
    the user-generated tags include a name of the overlay multicast network; and
    each virtual machine instance of the plurality of virtual machine instances is further configured to:
        obtain, from the data storage system, metadata of each of the collection of computing resources having a user-generated tag with the name of the overlay multicast network; and
        determine, based at least in part on the metadata, how to update to the desired state of the network topology of the overlay multicast network.

5. The system of claim 1, wherein each virtual machine instance of the plurality of virtual machine instances is configured to, further on the condition that the response indicates the desired state that is different from the current state, de-configure the point-to-point communication channel from at least one virtual machine instance lacking from the response to the query.

6. The system of claim 1, wherein the data storage system is a virtual machine metadata tag service that stores the information defining the network topology for the overlay multicast network, the information including one or more metadata tags specifying at least one virtual machine instance that is to participate in the overlay multicast network.

7. The system of claim 1, wherein:
the collection of computing resources comprises a physical network substrate that supports the overlay multicast network; and
the overlay multicast network is configured to support a network protocol that is at least partially unsupported by the physical network substrate.

8. The system of claim 7, wherein the physical network substrate includes a first router configured to be within a first administrative domain and a second router configured to be within a second administrative domain different from the first administrative domain.

9. A computer-implemented method, comprising:
participating by a virtual machine instance in communications in a network configured to operate using point-to-point communications in accordance with a generic routing encapsulation (GRE) communication protocol;
submitting, to a virtual machine metadata tag service that is external to the network, multiple queries over time for information about the network; and
as a result of a response to a query of the multiple queries indicating a change to the network indicated by the virtual machine metadata tag service, updating, based at least in part on the change, the virtual machine instance to participate in the network in accordance with the communication protocol and to operate as a network host.

10. The computer-implemented method of claim 9, wherein the virtual machine metadata tag service external to the network is a data storage system configured to store information defining a network topology of the network.

11. The computer-implemented method of claim 10, wherein the information defining the network topology of the network includes a user-generated tag associated with a corresponding device in the network.

12. The computer-implemented method of claim 9, wherein the communication protocol is an overlay multicast protocol.

13. The computer-implemented method of claim 9, wherein:
the change to the network includes a new virtual machine instance participating in communications in the network; and
updating to participate in the network includes updating to communicate with the new virtual machine instance.

14. The computer-implemented method of claim 9, wherein:
the change to the network includes removal, from the network, of a particular device in the network; and
updating to participate in the network includes removing an ability to communicate with the particular device.

15. A system, comprising:
a collection of computing resources collectively configured to implement at least a portion of a network comprising a plurality of virtual machine instances, the plurality of virtual machine instances specified in metadata of a virtual machine metadata tag service as defining a network topology of the network, each virtual machine instance of the plurality of virtual machine instances being configured to:
operate as a network host;
receive, from the virtual machine metadata tag service, information indicating an updated network topology of the network; and
as a result of receiving the information, perform one or more actions to cause the virtual machine instance to act in conformity with the updated network topology, the one or more actions including establishing a point-to-point communication channel using generic routing encapsulation (GRE) protocol between the virtual machine instance and another virtual machine instance of the plurality of virtual machine instances.

16. The system of claim 15, wherein the network is an overlay multicast network.

17. The system of claim 15, wherein the information is received in response to a query submitted to the virtual machine metadata tag service by the virtual machine instance.

18. The system of claim 15, wherein the information indicating the updated network topology of the network comprises metadata including a tag for the collection of computing resources.

19. The system of claim 15, wherein the updated network topology lacks at least one virtual machine instance that was previously participating in the network.

20. The system of claim 15, wherein the updated network topology includes an addition of at least one virtual machine instance to the network.

21. The system of claim 15, wherein the network supports a communication protocol that is at least partially unsupported by the collection of computing resources.

22. One or more non-transitory computer-readable storage media having collectively stored therein instructions that, as a result of being executed by one or more processors of a system, cause the system to:
submit a query to a virtual machine metadata tag service configured to store information defining a network topology of a network comprising a plurality of virtual machine instances configured to operate as network hosts, the plurality of virtual machine instances dynamically defining a plurality of virtual machine instances indicated by the virtual machine metadata tag service;
receive a response to the query that is based at least in part on the information; and
perform one or more actions if the response to the query indicates a different state of the network topology than a current state of the network topology, the one or more actions including establishing point-to-point communication channels using generic routing encapsulation (GRE) protocol between a new virtual machine instance identified in the response to the query and another virtual machine instance of the plurality of virtual machines instances.

23. The one or more non-transitory computer-readable storage media of claim 22, wherein the information defining the network topology of the network comprises a user-generated tag associated with a device in the network.

24. The one or more non-transitory computer-readable storage media of claim 22, wherein the response to the query indicates a removal of one or more virtual machine instances from the network topology.

25. The one or more non-transitory computer-readable storage media of claim 24, wherein the one or more actions include de-configuring a communications channel to the one or more virtual machine instances removed from the network topology.

26. The one or more non-transitory computer-readable storage media of claim 22, wherein the response to the query indicates that one or more virtual machine instances are added to the network topology.

27. The one or more non-transitory computer-readable storage media of claim 26, wherein the one or more actions include establishing a communications channel to the one or more virtual machine instances that are added to the network topology.

* * * * *